Sept. 13, 1955 A. W. KEESHAN ET AL 2,717,756
FILM HOLDERS
Filed June 23, 1950 4 Sheets-Sheet 4
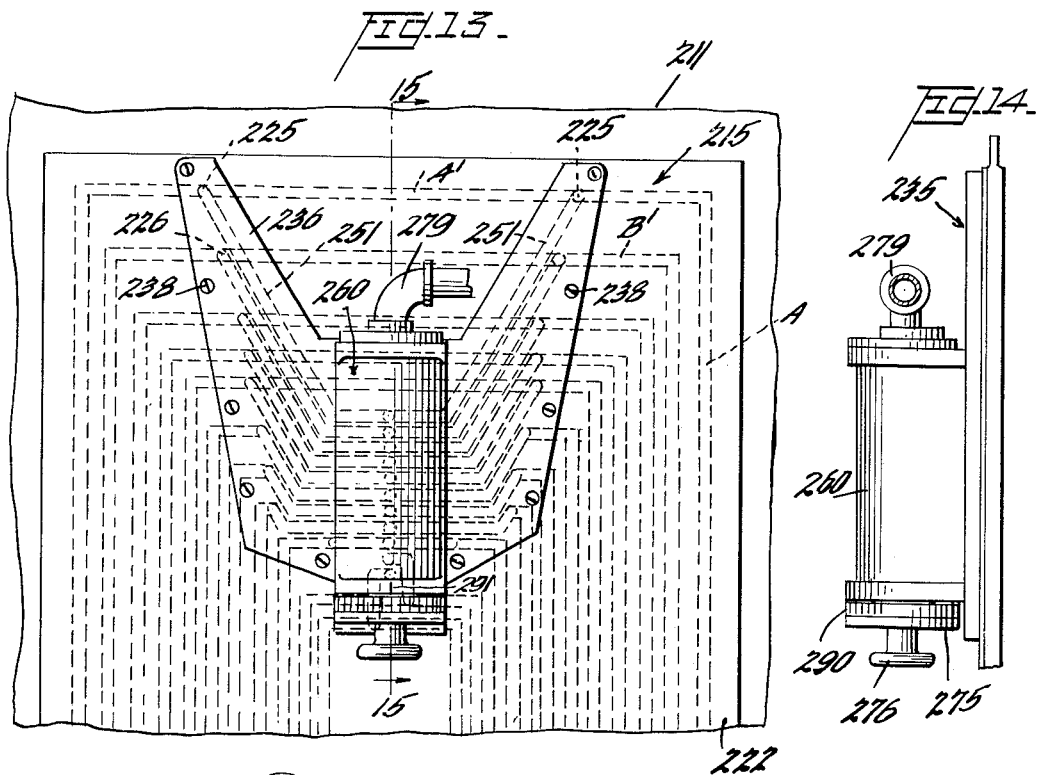
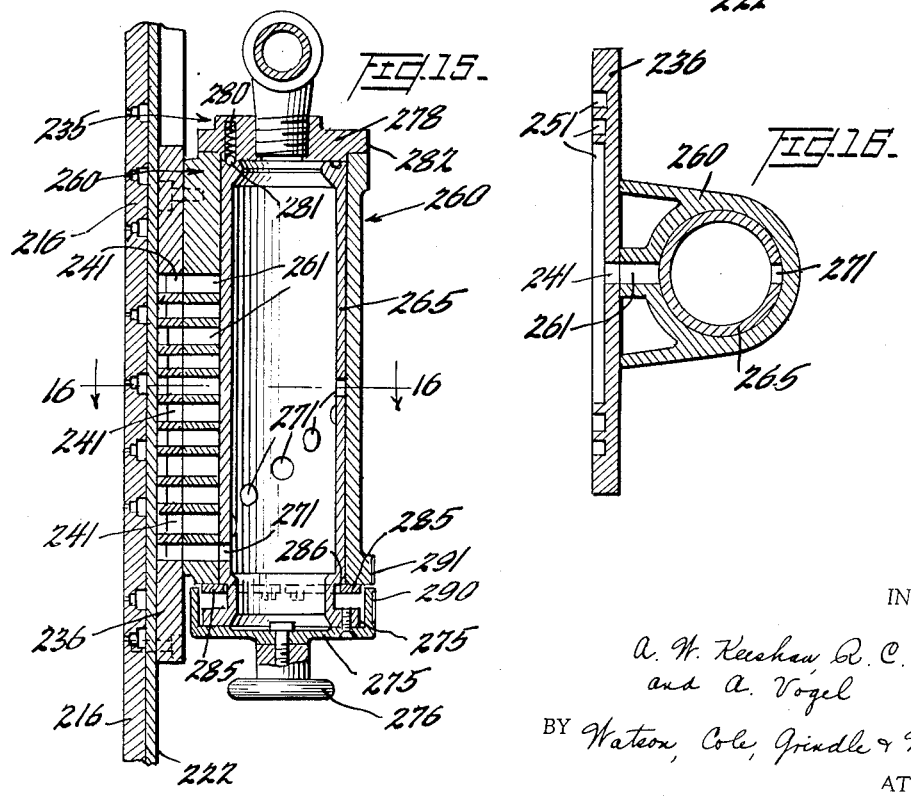
INVENTOR
A. W. Keeshan, R. C. Marder
and A. Vogel
BY Watson, Cole, Grindle & Watson
ATTORNEYS

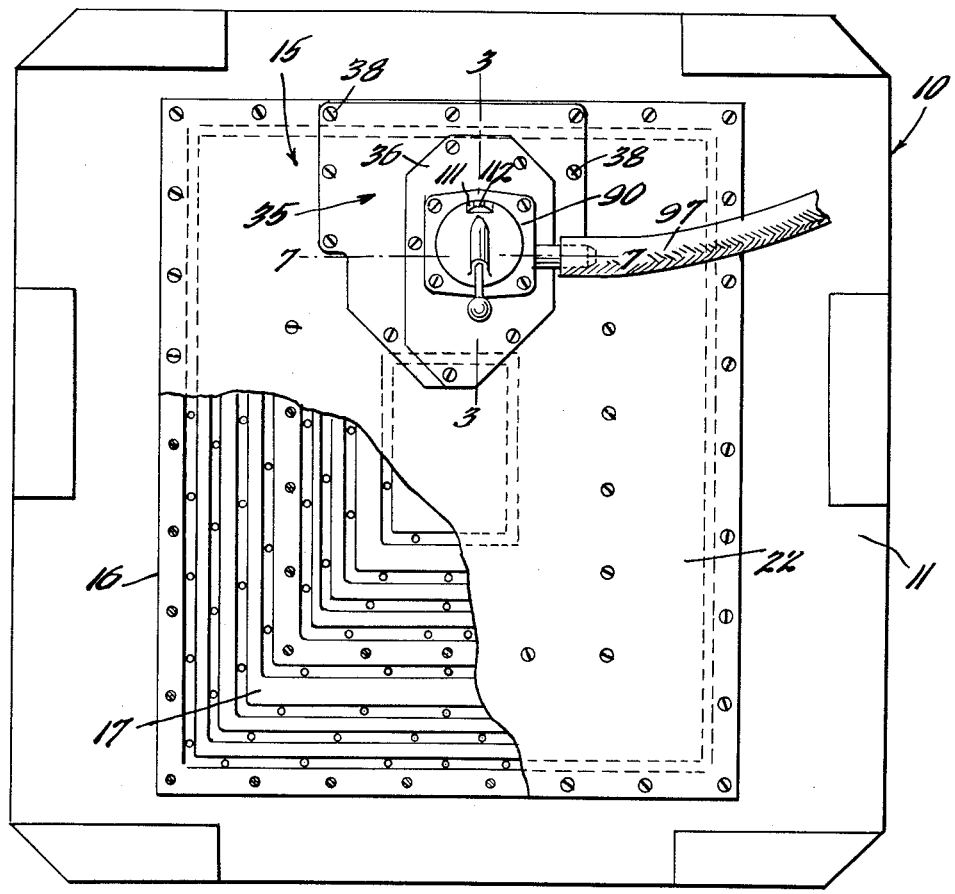
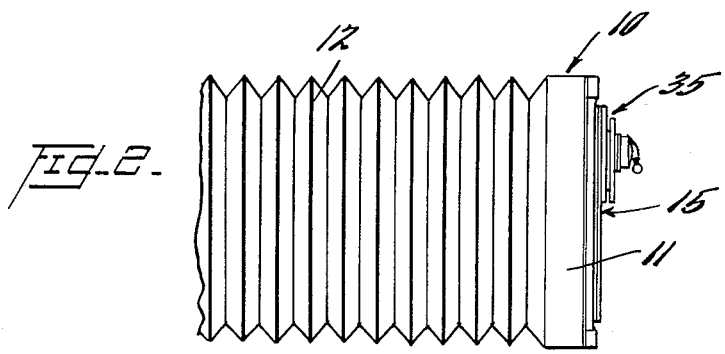

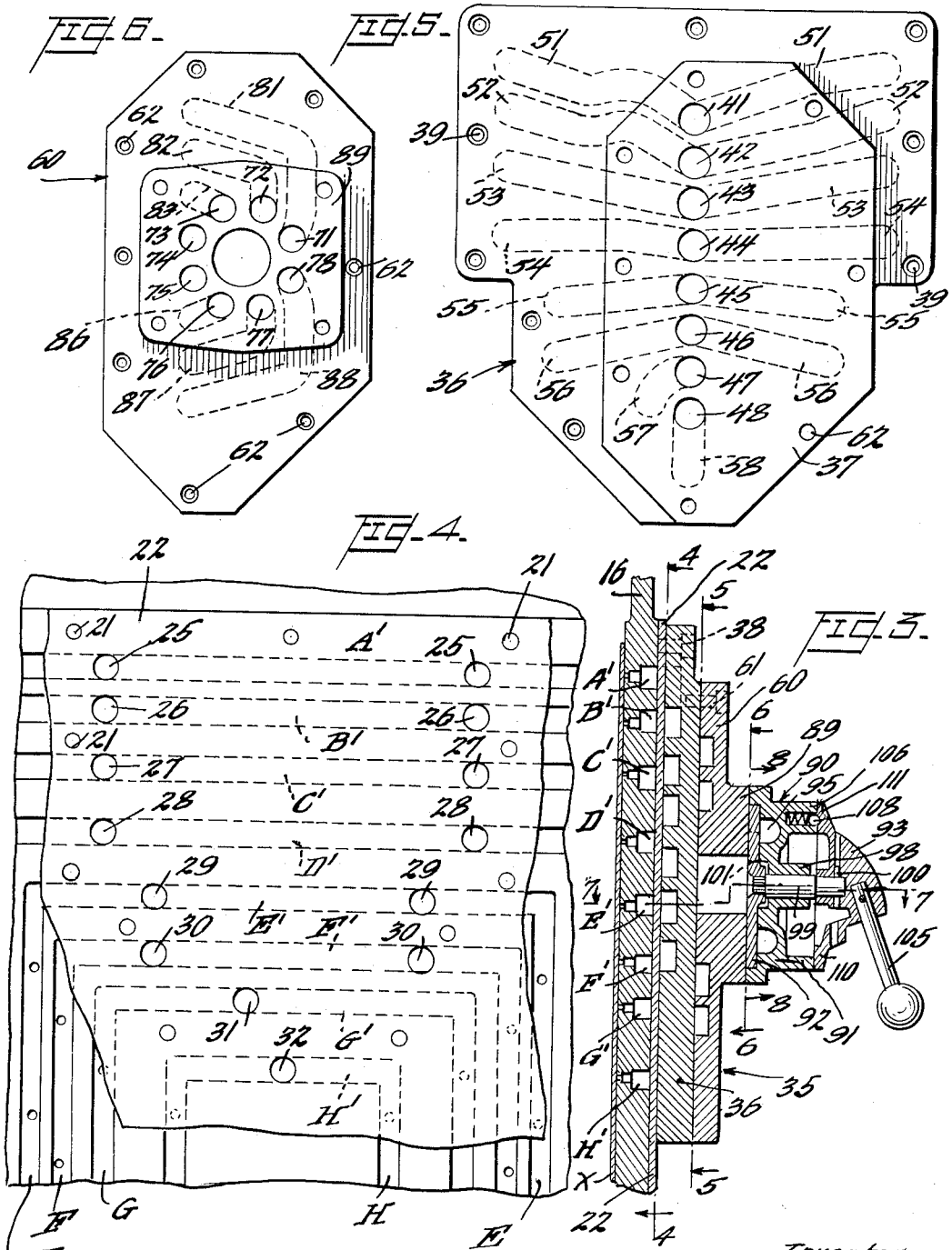

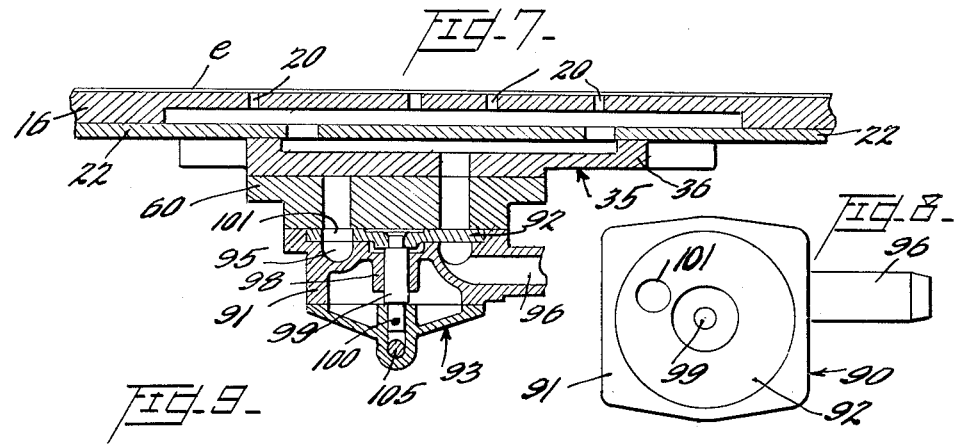
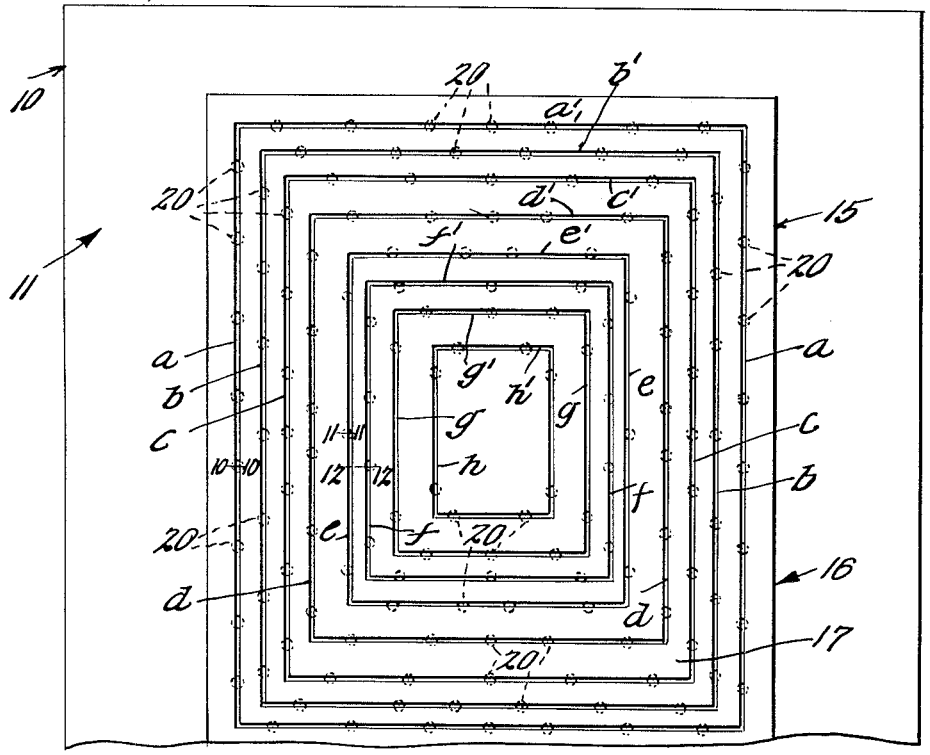
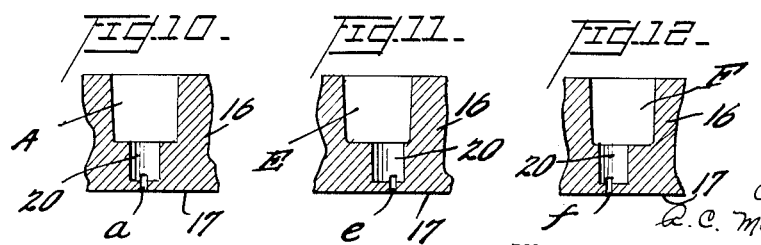

United States Patent Office 2,717,756
Patented Sept. 13, 1955

2,717,756

FILM HOLDERS

Alvin William Keeshan, North Arlington, Richard Collins Marder, Plainfield, and Albert Vogel, North Plainfield, N. J., assignors to American Type Founders, Inc., a corporation of New Jersey Application June 23, 1950, Serial No. 169,804

2 Claims. (Cl. 248—363)

This invention relates to film or sheet holders, and more particularly to devices of this class in which vacuum is employed to hold a film or flexible sheet firmly and evenly—and preferably in a perfect plane—against a flat plate or base.

Devices of this description are well known in the art of photography and especially in the field of process photography, such as for photo-engraving, photo-lithography and other reproduction work.

However, in its broadest aepects, the invention is not limited stricly to these fields but contemplates generally the provision of a novel and improved film or sheet holding device of simple construction, easy and economical to manufacture, and of peculiar efficiency and adaptability to use in a variety of different embodiments, and for the mounting of flexible sheets of a wide range of sizes and shapes, so that they may be held flat in a single plane, as accurately as a rigid glass plate might be positioned.

One of the principal features of novelty of the invention lies in the novel means for applying the vacuum or suction—in the accurate positioning of the sheet upon the holder—more strongly to one localized area, preferably adjacent an edge of the sheet, to establish an initial holding effect at such area, whereupon the remainder of the sheet may then be applied with an eventual spreading of the vacuum effect to all areas as successive portions of the sheet come into contact with the holder.

The invention contemplates also the provision of means embodied in a given holder or backing plate for attaining this progressive adhesion of sheets of a number of different sizes, thus making a single backing plate suffice for a wide variety of work.

Although the invention is applicable to copy holders, printing paper frames, camera backs, and many other types of sheet holders, it is illustrated in the present specification as applied to a process camera back and will be described in that connection, but the disclosure is purely exemplary and illustrative and the scope of the invention is not to be limited by the disclosure but only by the subjoined claims.

Other objects and feature of novelty, including novel and improved valving means for applying the suction, will be apparent from the following specification when read in connection with the accompanying drawings, in which two specific embodiments of the broad principles of the invention are illustrated.

In the drawings:

Figure 1 is a view in rear elevation of a process camera to which is applied a vacuum back embodying the principles of the invention;

Figure 2 is a fragmentary view in side elevation of the camera, showing only the rear or plate holding portion and a part of the bellows;

Figure 3 is a vertical sectional view through the novel vacuum back, taken on line 3—3 of Figure 1, and showing the internal parts of the valving and suction distributing mechanism;

Figure 4 is a fragmentary sectional view, taken on line 4—4 of Figure 3, with a portion of the vacuum back cover plate broken away marginally to show the grooves in the rear of the vacuum back proper;

Figure 5 is a view in rear elevation of the vacuum back cover air chest member, substantially as seen from line 5—5 of Figure 3;

Figure 6 is a similar view of the selector valve air chest member as seen from line 6—6 of Figure 3;

Figure 7 is a transverse sectional view substantially on lines 7—7 of Figure 1 and Figure 3;

Figure 8 is a view in rear elevation of the selector valve body substantially as viewed on lines 8—8 of Figures 3 and 7;

Figure 9 is a view in front elevation of the vacuum back proper looking upon the surface to which the film or paper is applied;

Figures 10, 11, and 12 are fragmentary transverse sectional views taken on lines 10—10, 11—11, and 12—12 respectively of Figure 9;

Figure 13 is a view in rear elevation of the upper portion of a camera back installation comprising another embodiment of the invention;

Figure 14 is a side view of the parts shown in Figure 13;

Figure 15 is a vertical sectional view taken on line 15—15 of Figure 13; and

Figure 16 is a horizontal sectional view taken on line 16—16 of Figure 15.

The first embodiment of the invention, illustrated in Figures 1–12 of the drawings, is shown as applied to a process camera designated generally by the reference numeral 10, this camera being provided with a back or film holding assembly 11 and a bellows 12 which, of course, is appropriately secured to the lens board (not shown).

The novel camera back installation itself is designated generally by the reference numeral 15 and is mounted within an opening formed in the back assembly 11 of the camera. The plate to which the film (designated X in Figure 3) is applied is generally termed a "vacuum back" and this vacuum back is designated by the numeral 16. The surface of the vacuum back to which the film or other sensitized sheet is applied is shown very clearly in plan in Figure 9 of the drawings and is referred to by the reference numeral 17.

Reference to Figures 3 and 9–12 inclusive shows how there are provided a series of rectangular grooved patterns of varying sizes through which suction may be applied to cause the sheet X to adhere firmly to the flat surface 17. In this particular embodiment of the invention, eight of these patterns are provided, being designated by the letters $a$, $b$, $c$, $d$, $e$, $f$, $g$, and $h$, ranging from the largest size downwardly to the smallest. The uppermost horizontal grooves of these groove patterns are separately designated as $a'$, $b'$, $c'$, $d'$, $e'$, $f'$, $g'$, and $h'$, and these are the portions of the suction groove patterns to which the upper margins of the films or sheets are to be initially applied in order to align them accurately and secure the preliminary adhesion of the upper portion of the sheet to the surface 17. In the application of such films or sheets it is convenient and efficient to apply the upper edge of the film or sheet to the upper marginal suction groove to which it corresponds and then cause progressive adherence of the sheet downwardly over its whole surface until the entire suction groove pattern is covered; and, as already stated, it is one of the principal objects of the invention to provide means for establishing suction in these upper transverse groove portions sufficient to cause such initial adherence while at the same time applying suction to the other portions of the particular groove pattern. Through the means provided and described herein, adequate vacuum is provided in the upper reaches of the groove pattern in spite of the fact that the source of vacuum is also connected to the lower portions thereof and not covered by the sheet.

Upon the rear surface of the vacuum back 16 there are provided a corresponding series of groove patterns corresponding in configuration and position with the patterns a–h inclusive but being of somewhat greater cross-section. These grooves may conveniently be designated in order of decreasing size A, B, C, D, E, F, G, and H, and the upper transverse reaches of these larger groove patterns are designated A', B', C', D', E', F', G', and H'. At intervals throughout the lengths of these narrow registering suction and supply grooves are small openings providing communication therebetween, these openings being designated by the reference numeral 20 regardless of their location since all are of the exact same nature, comprising small drilled holes in the inner portion of the plate or back 16.

To the rear surface of the vacuum back 16 there is secured, as by means of the screws or other fastening devices 21, a cover plate 22 which seals off the remaining side of the supply grooves A–F inclusive converting them into closed ducts of fairly small cross-section. In order to provide communication between these suction supplying ducts and the source of suction, openings are provided in the cover plate 22, but these openings are positioned only at points along the upper reaches of the supply grooves or ducts A'–H'. The two openings communicating with the duct A' are designated 25; the two openings connecting with the groove B' are indicated at 26; those applied to grooves C' are shown at 27; the openings for the groove D' are indicated at 28; those for E' at 29; and the two openings for groove F' at 30. It will be noted that for the shorter grooves G' and H' only one opening for each groove is necessary and the respective openings are designated 31 and 32.

In order to direct the suction selectively to these openings to apply it to the groove pattern appropriate to the size of sheet being used, a selector valve assembly is provided which is designated generally by the reference numeral 35. This assembly is best seen in its entirety in Figures 1, 3, and 7 of the drawings, and comprises several superposed parts including air chests and valving means which will now be described. The first unit of the selector valve assembly is shown in plan in Figure 5 of the drawings and is designated by the reference numeral 36. This unit 36 may be termed the cover plate air chest and it comprises an irregularly shaped rather thick plate having a bossed or raised outer surface 37 to which a subsequent unit of the assembly is applied.

The air chest member 36 itself may be applied to the cover plate and vacuum back by means of screws or suitable fastening members 38 which pass through openings 39 in the unit. Approximately centrally of the air chest member 36 there is provided a vertical line of drilled openings 41–48 inclusive. The forward face of the unit 36 is provided with grooves which when the unit is applied to the cover plate form distributing ducts leading from the openings 41–48 inclusive to the several openings 25–32 inclusive of the cover plate. These ducts are respectively designated by the reference numerals 51–58 inclusive, all as clearly shown in Figure 5 of the drawings. The correspondence of the openings and ducts in the air chest 36 with those in the vacuum back cover plate assembly will be readily realized by reference to Figures 4 and 5 of the drawings, it being understood that the unit shown in Figure 5 is superposed upon the area of the vacuum back shown in Figure 4. The ducts 51–56 inclusive are double, of course, to communicate with the pairs of openings 25–30 inclusive, and but a single duct 57 or 58 is necessary to connect the openings 47 and 48 with the openings 31 and 32 leading to the smallest sizes of vacuum groove patterns.

It is convenient to employ rotary valving devices for selecting the appropriate vacuum frames or patterns to which suction is to be applied, and for this purpose it is desired to connect the aligned openings 41–48 in the cover plate air chest 36 with a circular series of openings which may be controlled by such a rotary valve, and thus there is provided a selector valve air chest 60. This member is shown very clearly in Figures 3, 6, and 7 and its base portion corresponds in general outline to the bossed surface 37 of the lower air chest, and may be secured to this area by means of screws 61 passing through the openings 62. The circular series of openings in the outer portion of the air chest 60 are designated by the reference numerals 71–78 inclusive, and this series of circular openings formed in the outer portion of the unit 60 is connected with the positions of the openings 41–48 inclusive of the element 36 by means of the grooves or ducts 81, 82, 83, 86, 87 and 88 as shown in Figure 6, there being no grooves designated 84 and 85 since the openings 74 and 75 register exactly with the openings 44 and 45 of the lower air chest element 36.

Secured to the bossed or raised portion 89 of the unit 60 is the selector assembly designated generally by the reference numeral 90. This selector assembly includes the valve body 91, the rotary valve disc 92, and the manually operated selector element 93. The valve body 90 is formed of a casting having an annular groove 95 in the forward part thereof which communicates with the cylindrical recess which snugly receives the valve disc 92. This duct or channel 95 is in communication with the nipple 96 to which a conduit 97 may be applied to provide connection with a suitable source of vacuum. A tubular inner portion 98 of the valve body casting serves to receive the valve shaft or stem 99 which is rigidly secured to the valve disc 92 and pinned as by means of the cotter 100 to the rotary selector head or element 93.

The valve disc 92 is provided with a single opening 101 which may be selectively brought into registration with one of the openings 71–78 in the boss 89 of the selector air chest 60 and thus bring the vacuum within the groove 95 selectively into communication with the ducts leading to the several vacuum frames of the vacuum back.

The selector 93 is provided with a handle 105 by means of which it may be rotated in order to adjust the valve. The annular outer marginal flange 106 of the valve body 91 is provided with a recess in which is seated a spring-pressed pawl detent 108 and a series of eight notches or indentations is provided on the underside of the flange 110 of the member 93 so that the selector 93 may be resiliently stopped at various points corresponding to the registration of the valve opening with the various ducts. In order to provide an indication of what vacuum groove frame is being supplied with suction, the selector member 93 is cut away or notched to provide a sight opening at 111 and an indication of the size of the frame being supplied with vacuum is engraved or imprinted upon the flange 106 of the valve body as indicated at 112 in Figure 1 of the drawings.

It will readily be seen that in operation, the selector member 93 is rotated until the appropriate designation of the frame to be used for attaching the particular sheet or film appears at the opening 111, and this will indicate that the valve disc opening 101 is in registry with that one of the circular series of openings 71–78 which communicates with the corresponding openings of the longitudinal series 41–48, which in turn communicates with those openings in the cover plate 22 which supply the grooves in the vacuum back appropriate to the size of sheet being used.

Since the vacuum is applied directly to the upper groove of the groove patterns disposed at the upper margin of the sheet to be supported, and in view of the fact that the communication with the fine grooves on the face of the vacuum back is through narrow openings and ducts, there will be sufficient vacuum applied to the upper reaches of the groove patterns to permit a slight but adequate suction effect for the initial application of the upper margin of the sheet to the vacuum back, even before the outlets around the other portions of the groove pattern are fully closed by the sheet.

In the embodiment illustrated in Figures 13-16 inclusive of the drawings, the rear portion of the camera, shown fragmentarily in Figure 13, is designated 211 and the camera vacuum back assembly is designated generally by the numeral 215. The vacuum back plate itself is shown at 216 and is formed in the same manner as the vacuum back 16 of the previously described embodiment, having fine grooves in the face thereof against which the film or sheet is applied, slightly larger grooves forming vacuum ducts on the rear face of the vacuum back, and small openings passing between the two sets of grooves. In this case there are eleven vacuum groove patterns making it possible to employ eleven different sizes of sheets or films in the camera. The supply ducts in the rear face of the vacuum back 216 will be designated only in respect to the largest one and the several smallest ones adjacent the center of the back. The largest pattern is designated A and the three smallest ones I, J and K. The respective upper transverse grooves of the several patterns are correspondingly designated A', I', J' and K'.

The ducts A, I, J and K are closed by the cover plate 222 and this cover plate is provided with spaced openings 225, 226, etc. down to the last groove I' which takes two openings, these being designated 229. It will be noted that the grooves J' and K' have but a single opening 233, 234.

The means for applying suction selectively to the upper grooves or ducts of the several vacuum patterns comprises a selector valve assembly designated generally by the reference numeral 235. This assembly comprises the adapter member 236 which in the present embodiment is of an irregular shape somewhat resembling the spread wings of a bird, this adapter being secured against the cover plate 222 as by means of the screws 238, and the forward face is provided with the divergent pairs of grooves designated generally and indiscriminately by the reference numeral 251. All of the upper connecting grooves or ducts are of very similar shape, but the groove connecting with the upper frame portion I' is in the form of a straight line and is designated by the numeral 257. Angular grooves 258 and 259 connect with the openings 230 and 234 which are in turn connected with the frame grooves J' and K'. All of the sets of grooves 251, 257, 258 and 259 lead from the openings in the cover plate to a straight line series of drilled openings 241 arranged medially of the adapter plate 236.

A generally cylindrical distributor valve housing designated generally by the reference numeral 260 is secured to the adapter plate 236 and is provided with an equal number of drilled openings 261 in its base, each of these openings registering with an opening 241 in the adapter plate. Within the valve casing or housing 260 there is rotatably mounted a hollow cylindrical valve member 265, this valve member being provided with a helical series of openings in its cylindrical wall, these openings being generally and indiscriminately designated by the reference numerals 271. It will be seen from an inspection of Figure 15 of the drawings that each one of these openings 271 is in alignment with one of the casing openings 261 but spaced successively around the helical course so that only one of the openings 271 can be in registry with its corresponding opening 240 in the adapter at a time.

The cylindrical valve member 265 is open at the upper end but is provided with a flanged lower end 27 to which is secured the flanged selector member 275. The valve 265 is secured against longitudinal movement within the casing 260 by means of the valve head 278 which is fixed to the casing 260 and provided with a nipple 279 affording connection with a source of vacuum. A recess 280 is provided in this valve head which receives a spring-pressed ball detent element 281 which is adapted to enter one of a circular series of indentations 282 in the upper end flange of the valve member 265, whereby the valve 265 may be resiliently held in a selected position. At the lower end of the casing 260 there is provided a split ring 285 bolted to the end of the casing and overlapping a shoulder 286 on the lower portion of the valve 265, thus securing the valve against displacement longitudinally while permitting rotary adjustment.

The cup-like selector element 275 carries upon the outer surface of its upwardly directed flanges a metallic tape 290 upon which is engraved or otherwise marked indicia of the size of the vacuum groove pattern with which the selected openings are placed in communication. A stationary datum line or reference point may be marked on the flange of the valve casing as at 291.

It will thus be readily seen that by rotating the handle 276 selected ones of the openings 271 on the valve cylinder may be brought into communication with corresponding openings 261 in the adapter, which latter openings are placed in communication with the various vacuum groove patterns by means of the successive openings, grooves, and ducts 241, 251, (257, 258, 259) 225, (230, 234) and the efficient placing of the films or papers may be effected just as in the case of the earlier described embodiment.

It is understood that various changes and modifications may be made in the embodiments illustrated and described herein without departing from the scope of the invention as defined by the following claims.

Having thus described the invention, what is claimed as new and desired to be secured by Letters Patent is:

1. A vacuum sheet holder of the class described comprising, in combination, a sheet supporting plate having an outer surface against which a sheet may be applied, a plurality of fine narrow slit-like grooves in said surface forming a plurality of substantially continuous or endless patterns, each of said patterns being of similar shape but of slightly less dimensions than the sheet to be supported, the grooves adapted to respectively underlie the margins of said sheet, an endless attenuated vacuum manifold duct following the configuration of each of said groove patterns, said duct being disposed behind the plate, minute openings connecting successive portions of said duct at the rear of the plate to the respective fine grooves in the outer surface of the plate, manually operated means for connecting a source of vacuum to any one of said attenuated ducts, said vacuum duct connection being at a point adjacent to certain of said openings which connect with the portion of each of said grooves which lies along a single corresponding edge of each of said patterns and thus along one edge of said sheet, the minute openings connecting with the remaining portions of the grooves at other margins of the sheet being progressively more remote from the point of connection of the source of vacuum, the minute nature of the openings and grooves restricting the velocity of air flow so that effective suction may be applied to each of said patterns along said one edge and cause the said edge of the sheet which may be initially applied to the plate to be accurately secured thereto, regardless of the fact that the remainder of the sheet is not yet applied to the rest of the groove patterns.

2. A vacuum sheet holder as in claim 1 wherein said manually operated means includes a valve casing, a connection to said casing affording communication between the interior thereof and a source of vacuum, a disc valve member in said casing having a single opening therein, said member being rotatable to place any one of said manifold ducts in communication with the interior of said casing and said vacuum source, an annular dial on said casing bearing indicia corresponding to each of the groove patterns, and a circular shield member rotatable with said valve member overlying said dial, said shield member being cut away to permit only that indicia corresponding to the particular pattern which is in communication with said vacuum source to be viewed, the remainder of said indicia being covered by said shield member.

References Cited in the file of this patent

UNITED STATES PATENTS

| Number | Name | Date |
|---|---|---|
| 1,347,824 | Pifer | July 27, 1920 |
| 1,813,689 | Weisker | July 7, 1931 |
| 1,813,690 | Weisker | July 7, 1931 |
| 1,945,481 | Dilkes | Jan. 30, 1934 |
| 2,133,518 | Huebner | Oct. 18, 1938 |
| 2,143,565 | Minea | Jan. 10, 1939 |
| 2,317,348 | Wekeman | Apr. 27, 1943 |
| 2,454,240 | Wekeman | Nov. 16, 1948 |
| 2,535,952 | Partridge | Dec. 26, 1950 |
| 2,572,640 | Lovegrove | Oct. 23, 1951 |